No. 833,912. PATENTED OCT. 23, 1906.
G. W. BELL.
ANTIVIBRATION DEVICE FOR AUTOMOBILES.
APPLICATION FILED NOV. 27, 1905.

2 SHEETS—SHEET 1.

WITNESSES.

INVENTOR.
George William Bell,
By
Attorneys.

No. 833,912. PATENTED OCT. 23, 1906.
G. W. BELL.
ANTIVIBRATION DEVICE FOR AUTOMOBILES.
APPLICATION FILED NOV. 27, 1905.

2 SHEETS—SHEET 2.

WITNESSES:

INVENTOR.
George William Bell
BY
ATTORNEYS.

UNITED STATES PATENT OFFICE.

GEORGE WILLIAM BELL, OF LIVERPOOL, ENGLAND.

ANTIVIBRATION DEVICE FOR AUTOMOBILES.

No. 833,912.  Specification of Letters Patent.  Patented Oct. 23, 1906.

Application filed November 27, 1905. Serial No. 289,243.

*To all whom it may concern:*

Be it known that I, GEORGE WILLIAM BELL, a subject of the King of Great Britain and Ireland, residing at Liverpool, in the county of Lancaster, England, have invented certain new and useful Improvements in and Connected with Antivibration Devices for Automobiles and Like Vehicles, of which the following is a specification.

My invention has particular reference to an improved running-gear for motor-vehicles; and the object of the invention is to enlarge upon the invention described in my prior Letters Patent, No. 598,280, of February 1, 1898, and make the same applicable to motor-vehicles of all descriptions. In the aforesaid Letters Patent a wheel with a pneumatic hub is shown and described, the wheel having two hubs, one within the other, the outer hub forming a rigid part of the wheel and revolving upon the inner hub, which is stationary with the axle, but vertically yieldingly supported thereon by an air-cushion formed between a piston held in fixed vertical connection with the axle and a cylinder formed in the inner hub. In this arrangement, which forms a substitute for the pneumatically-tired wheel, the jar and concussions received by the wheel in traveling upon rough roads are transmitted to the inner hub and are taken up by the air-cushion without transmitting them to the axle. In applying this so-called "pneumatic-hub" wheel to motor-vehicles it becomes necessary for obvious reasons to provide means not only for varying the pressure of air of the air-cushion in accordance with the varying load the vehicle is intended to carry, but also for maintaining such pressure by forcing in additional air to make up for the loss of air by leakage which it will be found impossible to prevent.

To this end my invention embodies a construction of pneumatic-hub wheel particularly adapted for motor-vehicles and involving certain new features in the construction of the parts and in the construction, arrangement, and operation of certain other devices for controlling the air-cushion, all as more fully hereinafter described, and shown in the annexed drawings, in which—

Figure 1:
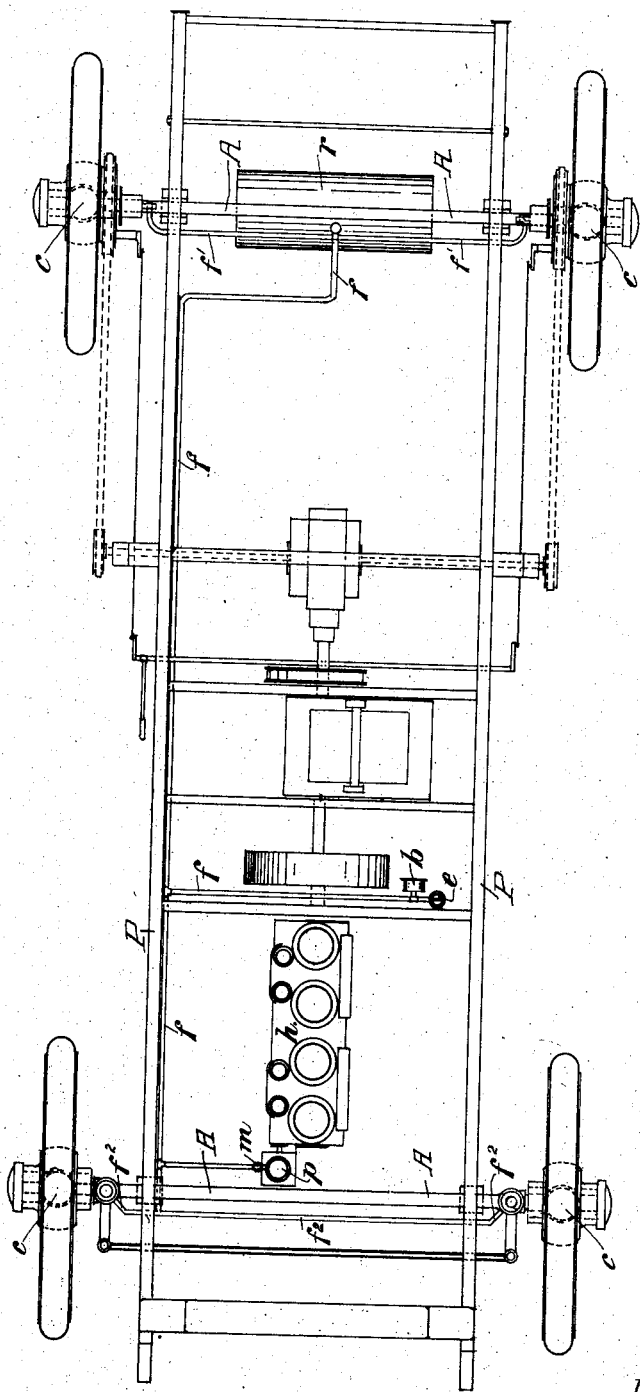
Figures 2, 3:
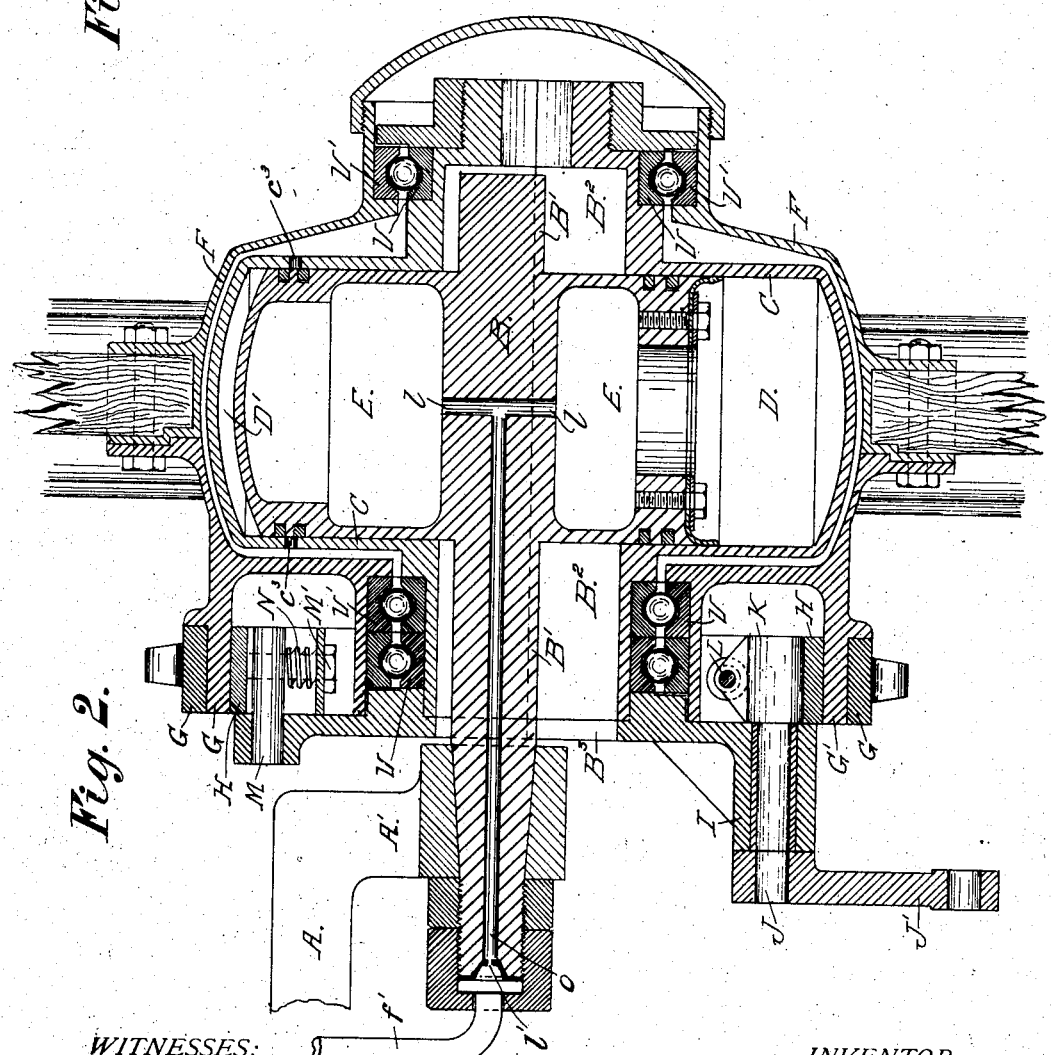

Figure 1 is a diagram plan view of a motor-vehicle running-gear embodying my invention. Fig. 2 is a vertical cross-section through one of the rear wheels; and Fig. 3 is an end elevation of Fig. 2, partly in section.

In the drawings, A represents that part of the rear axle upon which the longitudinal frame members P are supported, and B is one of the stub-axles which carry the rear wheels. The part A is provided with an offset A', in which the stub-axle B is rigidly secured in any suitable manner, but preferably detachable.

C is the inner hub upon which the wheel revolves. This is formed upon its opposite ends with vertical guide-slots $B^2$, which engage with flattened portions B' of the stub-axle, and thereby guide the inner hub and prevent it from revolving.

D D' are air-chambers formed in the inner hub, one above and one below the stub-axle. E and E' are two pistons engaging into these air-chambers, respectively, and coöperating therewith to form two air-cushions, the one below the stub-axle forming the air-cushion or air-spring which yieldingly supports the weight upon the wheel and the one above operating as a dash-pot or check-spring to check the vertical play of the inner hub upon the stub-axle. It communicates with the outer air under the control of the piston E' through a vent-hole $c^3$. The two pistons carry a suitable packing to make them fit airtight, and both are hollow and form air-chambers which communicate with each other and with the lower air-chamber D in such manner as to form an enlargement of said lower air-chamber D.

F is the outer hub, which is a part of the wheel itself, and it is suitably shaped to inclose the inner hub and permit the wheel to revolve thereon, suitable ball-bearings V, traveling in ball-races V', being preferably interposed between it and the inner hub.

G is the sprocket-wheel which transmits motion to the wheel.

G' is a flange on the wheel-hub upon which the sprocket-wheel is mounted.

H is a friction brake-ring coöperating with the inner face of the flange G' to form a friction hub-brake.

I is a bracket supporting the actuating parts of the brake mechanism. It is secured to the inner end of the inner hub by screws $x$ and provided with a slot $B^3$ to let the stub-axle pass through.

J is a shaft journaled in an arm of the bracket I and carrying at its outer end the crank-arm J', to which the brake-rod is to be connected.

K is a cam on the inner end of the shaft, extending between the severed ends of the friction-ring.

L is a spring operating to draw the severed ends of the friction-ring together.

M is a pin secured in an upwardly-extending arm of the bracket I.

M' is a headed bolt suspended from the pin M and supporting the friction-ring within the flange G'.

N is a spring interposed between the head of the bolt M' and the pin M.

O is an air-passage in the stub-axle, connecting through branches $l$ with the air-chamber D.

$f'$ is a compressed-air-supply pipe coupled to the inner end of the stub-shaft and communicating, through the passage O and branches $l$, with the air-chamber D, and $l'$ is a check-valve controlling the passage and preventing the escape of air from the air-chamber D. In the case of the front wheels the air-supply pipes, if connected to the inner end of the spindles, will be provided with a suitable joint (or flexible connection) to permit the steering. The parts being constructed as shown and described, it will be readily understood that by filling the chamber D with compressed air of suitable pressure the wheel will support the stub-axle upon an air-spring formed by the air in the chamber D and connecting-passages, and thus prevent the direct transmission of the jars to which the wheel is subjected on rough and uneven roads to the frame and body of the vehicle, thus forming a substitute for the pneumatically-tired wheels and enabling me to discard the same and use a solid rubber tire or any other form of solid tire. The action of the air-chamber D' in forming a so-called "dash-pot" or "check-spring" will also be readily understood.

Compared with my former invention, as described in the above-mentioned Letters Patent, it will be seen that my present construction makes the invention applicable to motor-vehicles in that it embodies means for applying power to the wheel for driving and for braking and, what is of equal importance, for varying the power of the air-spring to suit different loads and for supplying additional air to compensate for loss by leakage, since even with the best construction there will be a gradual leakage of air from the air-chamber D. I accomplish both objects automatically by the following described means: To a shaft driven by the engine $h$ is connected a small air-pump $p$ of any suitable form. This is connected, by means of a suitable conduit $f$ through a check-valve $m$, to an air-tank $r$, located on the rear axle, and also to an adjustable safety-valve $e$ and pressure-gage $b$, located on the dashboard, also conduits $f'$ and $f^2$, which conduct the air to the front and rear wheels, respectively.

In operation when the engine is started up the pump $p$ compresses the air into the tank $r$ to a pressure (which is set and regulated by the valve $e$ by the driver and shown on the pressure-gage) sufficiently great to support the car and load under the condition of the suspension required. Due to the presence of the check-valve $l'$, or in lieu thereof a reduced orifice, if any one of the wheels meets with an obstruction the resulting compression of air in the air-chamber D will not be transmitted through the conduits to the air tank or pipe.

To provide for the adjustment of the resiliency of the air in the chamber D of the device without raising the pressure therein substantially higher than is necessary to suspend and support the car and load and at the same time confine the displacement to the limits afforded by the construction and design of the respective parts of the device, I reduce the volume of air or column in the body of piston and cylinder by introducing into the chamber D a greater quantity of lubricant than is essential for lubrication of the piston. This liquid by displacing a portion of the volume of air therein will cause the pressure or resistance to rise more rapidly for the same displacement of the piston in the cylinder than it was possible before the introduction of the lubricant.

The system herein described affords facilities for the driver to adjust from the seat, while the car is in motion, the desired degree of resiliency of the supporting air-springs by simply raising the pressure or lowering the same in the air tank and system by regulating the valve $e$, as circumstances demand.

It will be obvious that the above invention or improvement is equally well applied to any other form of antivibration device—viz., that form in which a bag or container is used between the piston and plunger or their equivalents without materially departing from this invention. It will also be understood that with a sufficiently capacious pipe system intermediate between the compressor and the wheels the air-storage tank may be dispensed with.

As above indicated, I may substitute for the check-valve $l'$ in the air-supply pipes a small orifice sufficiently restricted to prevent the amount of air in the air-chambers D to be appreciably increased or decreased by the sudden compression or expansion of the air-spring in the travel of the vehicle over uneven and rough roads and yet permit the gradual reduction of the amount of air in the air-chamber by the reduction of the air-pressure in the tank, as might be desirable or necessary after relieving the vehicle of a heavy load. I preferably, however, use a check-valve and make a small hole through it. The same object may be obtained with a check-valve, although not automatically, by means of air-relief valves or cocks from the air-chambers, which might be operated by hand. It is also obvious that either by means of a varying amount of lubricant introduced in the air-chambers D through the air-supply pipes or otherwise the resiliency of the different pneumatic springs can be differentiated as may be necessary, or the air-chambers may be varied in their capacity by means of partitions in the pistons or otherwise.

Having thus fully described my invention, what I claim is—

1. The combination with a motor-vehicle running-gear embodying in its construction pneumatic-hub wheels which interpose between the axles and the hub of each wheel a variable air-chamber forming a pneumatic spring-support for the frame, of an air-tank, an air-compressor operated by the motor of the vehicle, connections between the tank and the air-chambers for supplying the same with compressed air, and means for varying the pressure of the air in the tank.

2. The combination with the motor-vehicle running-gear embodying in its construction pneumatic-hub wheels which interpose between the axle and the hub of each wheel a variable air-chamber forming a pneumatic spring-support for the frame, of an air-tank, an air-compressor for supplying said tank with compressed air, means for operating the same by power derived from the motor of the vehicle, connections between the tank and the air-chambers for supplying the same with air under pressure, check-valves in said connections, and means for varying the pressure of air in the tank.

3. The combination with a motor-vehicle running-gear embodying in its construction pneumatic-hub wheels which interpose between the axles and the hub of each wheel a variable air-chamber forming a pneumatic spring-support for the frame and load thereon, means operated by the motor for compressing air, means for supplying the compressed air into the air-chambers forming the pneumatic springs and means for increasing or reducing the air-pressure in said chambers under control of the operator.

4. In motor-vehicles embodying in their construction pneumatic-hub wheels of the character described, the herein-described method of varying or modifying the resiliency formed by the pneumatic devices of such wheels by the use of lubricants introduced into the air-chambers of the devices.

5. The combination in a motor-vehicle running-gear, a pneumatic-hub wheel comprising a stub-axle, a wheel formed with an outer hub forming a part of the wheel, and an inner stationary hub upon which the outer hub is journaled, said inner hub formed with air-chambers located in the vertical plane of the stub-axle, pistons carried by the stub-axle and coöperating with said air-chambers to form a pneumatic supporting-spring below the stub-axle and a check-spring above the same, an air-passage leading through the stub-axle into the lower air-chamber, a compressed-air-supply pipe connecting with said passage, means for supplying compressed air and means for controlling the pressure of the air in said chambers.

6. The combination in a motor-vehicle running-gear, a pneumatic-hub wheel comprising a stub-axle offset from the main part of the axle, a supporting-wheel formed with an outer hub constituting a rigid part of the wheel, an inner stationary hub mounted upon and vertically guided by said stub-shaft, pistons carried by said stub-shaft in the vertical plane thereof, cylinders formed on the inner hub coöperating with said pistons to form a supporting air-spring below and an air-check spring above said stub-shaft, an air-passage in the stub-shaft leading into the lower air-chamber, a connection between said passage and a compressed-air-supply tank, and a check-valve controlling the escape of air from said passage and having a restricted orifice through it adapted to permit a slow escape of air.

In testimony whereof I affix my signature in presence of two witnesses.

GEORGE WILLIAM BELL.

Witnesses:
OTTO F. BARTHEL,
THOS. G. LONGSTAFF.